US008740095B2

(12) United States Patent
Dichtl

(10) Patent No.: US 8,740,095 B2
(45) Date of Patent: Jun. 3, 2014

(54) SECURITY ELEMENT

(75) Inventor: Marius Dichtl, München (DE)

(73) Assignee: Giesecke & Devrient GmbH, Munich (DE)

(*) Notice: Subject to any disclaimer, the term of this patent is extended or adjusted under 35 U.S.C. 154(b) by 45 days.

(21) Appl. No.: 12/304,522

(22) PCT Filed: Jun. 13, 2007

(86) PCT No.: PCT/EP2007/005201
§ 371 (c)(1),
(2), (4) Date: Dec. 12, 2008

(87) PCT Pub. No.: WO2008/000351
PCT Pub. Date: Jan. 3, 2005

(65) Prior Publication Data

US 2009/0322071 A1 Dec. 31, 2009

(30) Foreign Application Priority Data

Jun. 27, 2006 (DE) ........................ 10 2006 029 850

(51) Int. Cl.
*G06K 19/06* (2006.01)

(52) U.S. Cl.
USPC .......................................... 235/494; 235/487

(58) Field of Classification Search
USPC ......................................... 235/487, 488, 494
See application file for complete search history.

(56) References Cited

U.S. PATENT DOCUMENTS 3,264,164 A * 8/1966 Jerothe et al. .................. 428/29
3,972,593 A * 8/1976 Appeldorn et al. ........... 359/742
4,892,336 A 1/1990 Kaule et al.
5,044,707 A 9/1991 Mallik
5,302,989 A * 4/1994 Taguchi et al. ................. 355/22
5,712,731 A * 1/1998 Drinkwater et al. .......... 359/619
5,995,638 A * 11/1999 Amidror et al. .............. 382/100
6,249,588 B1 * 6/2001 Amidror et al. .............. 382/100

(Continued)

FOREIGN PATENT DOCUMENTS

DE 102005062132 A1 7/2007
EP 0330733 A1 9/1989

(Continued)

OTHER PUBLICATIONS

Hutley M.C. et al., "The moire magnifier," Pure Appl. Opt. 3:133-142,1994.

(Continued)

*Primary Examiner* — Paultep Savusdiphol
(74) *Attorney, Agent, or Firm* — Lathrop & Gage LLP

(57) ABSTRACT

The present invention relates to a security element for security papers, value documents and the like, having a micro-optical moiré magnification arrangement having a motif image (30) that consists of a planar periodic or at least locally periodic arrangement of a plurality of micromotif elements (36, 38), and a planar periodic or at least locally periodic arrangement of a plurality of microfocusing elements for the moiré-magnified viewing of the micromotif elements (36, 38) of the motif image, the motif image (30) including two or more sub-regions (32, 34) having micromotif elements (36, 38) that differ from each other in their contrast, and wherein the shape of the sub-regions (32, 34) forms, due to the contrast differences in the micromotif elements (36, 38), a perceptible macroscopic piece of image information in the form of characters, patterns or codes.

30 Claims, 4 Drawing Sheets

(56) References Cited

U.S. PATENT DOCUMENTS

Figure 1:
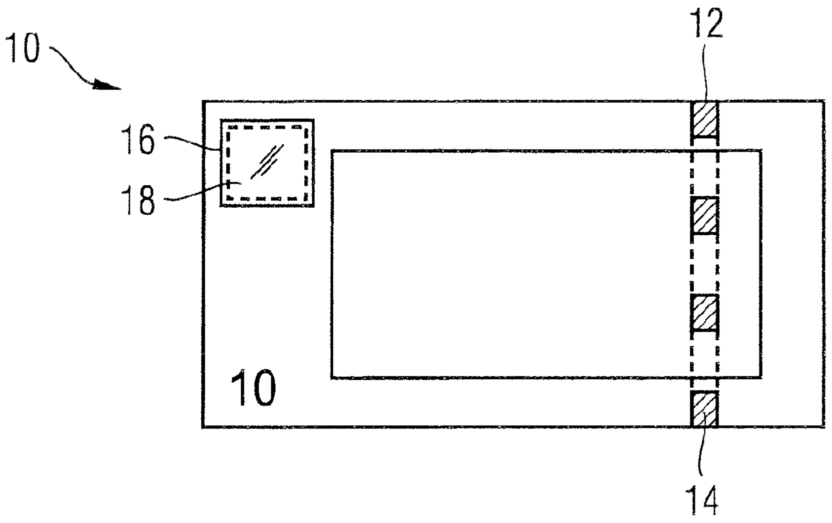

| | | | | |
|---|---|---|---|---|
| 7,130,126 | B1 * | 10/2006 | Chung | 359/619 |
| 7,468,842 | B2 * | 12/2008 | Steenblik et al. | 359/619 |
| 7,488,002 | B2 * | 2/2009 | Ahlers et al. | 283/72 |
| 7,667,894 | B2 | 2/2010 | Hoffmuller | |
| 7,728,931 | B2 | 6/2010 | Hoffmuller | |
| 7,808,605 | B2 | 10/2010 | Hoffmuller | |
| 2002/0012447 | A1 * | 1/2002 | Amidror et al. | 382/100 |
| 2004/0084893 | A1 * | 5/2004 | Fan et al. | 283/72 |
| 2007/0058260 | A1 * | 3/2007 | Steenblik et al. | 359/626 |
| 2007/0165182 | A1 | 7/2007 | Hoffmuller | |
| 2007/0177131 | A1 * | 8/2007 | Hansen | 356/71 |
| 2007/0211238 | A1 | 9/2007 | Hoffmuller | |
| 2007/0216518 | A1 | 9/2007 | Hoffmuller | |
| 2007/0229928 | A1 | 10/2007 | Hoffmuller | |
| 2007/0241551 | A1 | 10/2007 | Heim | |
| 2007/0246933 | A1 | 10/2007 | Heim | |
| 2007/0274559 | A1 | 11/2007 | Depta | |
| 2008/0014378 | A1 | 1/2008 | Hoffmuller | |
| 2008/0054621 | A1 | 3/2008 | Burchard | |
| 2008/0079257 | A1 | 4/2008 | Fessl | |
| 2008/0088859 | A1 | 4/2008 | Depta | |
| 2008/0160226 | A1 | 7/2008 | Kaule | |
| 2008/0163994 | A1 | 7/2008 | Hoppe | |
| 2008/0198468 | A1 | 8/2008 | Kaule | |
| 2008/0216976 | A1 | 9/2008 | Ruck | |
| 2008/0250954 | A1 | 10/2008 | Depta | |
| 2008/0258456 | A1 | 10/2008 | Rahm | |
| 2009/0001709 | A1 | 1/2009 | Kretschmar | |
| 2009/0008923 | A1 | 1/2009 | Kaule et al. | |
| 2009/0008926 | A1 | 1/2009 | Depta | |
| 2009/0102605 | A1 | 4/2009 | Kaule | |
| 2009/0115185 | A1 | 5/2009 | Hoffmuller | |
| 2009/0236061 | A1 | 9/2009 | Gruszczynski | |
| 2009/0297805 | A1 | 12/2009 | Dichtl | |
| 2009/0322071 | A1 | 12/2009 | Dichtl | |

FOREIGN PATENT DOCUMENTS

| | | | |
|---|---|---|---|
| EP | 0439092 | A2 | 7/1991 |
| EP | 0238043 | A2 | 2/1993 |
| EP | 0064067 | B2 | 3/2002 |
| WO | WO 2005/052650 | A2 | 6/2005 |
| WO | WO 2005/106601 | A2 | 11/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006/029744 | A1 | 3/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |
| WO | WO 2008/000350 | | 1/2008 |
| WO | WO 2008/000351 | | 1/2008 |

OTHER PUBLICATIONS

International Search Report, International Application No. PCT/EP2007/005201, Nov. 29, 2007, 3 pages.

International Preliminary Report on Patentability, International Application No. PCT/EP2007/005201, Jan. 13, 2009, 8 pages.

* cited by examiner

SECURITY ELEMENT

CROSS-REFERENCE TO RELATED APPLICATIONS

This application is the U.S. National Stage of International Application No. PCT/EP2007/005201, filed Jun. 13, 2007, which claims the benefit of German Patent Application DE 10 2006 029 850.0, filed Jun. 27, 2006; both of which are hereby incorporated by reference to the extent not inconsistent with the disclosure herewith.

The present invention relates to a security element for security papers, value documents and the like, and especially relates to such a security element having a micro-optical moiré magnification arrangement. The present invention further relates to a method for manufacturing such a security element, a security paper and a data carrier having such a security element.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanostructures, such as with conventional embossed holograms or other hologram-like diffraction patterns, as are described, for example, in publications EP 0 330 733 A1 and EP 0 064 067 A1.

It is also known to use lens systems as security features. For example, in publication EP 0 238 043 A2 is described a security thread composed of a transparent material on whose surface a grating composed of multiple parallel cylindrical lenses is embossed. Here, the thickness of the security thread is chosen such that it corresponds approximately to the focal length of the cylindrical lenses. On the opposing surface, a print image is applied in perfect register, the print image being designed taking into account the optical properties of the cylindrical lenses. Due to the focusing effect of the cylindrical lenses and the position of the print image in the focal plane, depending on the viewing angle, different sub-areas of the print image are visible. In this way, through appropriate design of the print image, pieces of information can be introduced that are visible only from certain viewing angles. Through a certain development of the print image, also "moving" images can be created. However, when the document is turned about an axis that runs parallel to the cylindrical lenses, the motif moves only approximately continuously from one location on the security thread to another location.

From publication U.S. Pat. No. 5,712,731 A is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. The moiré pattern created here constitutes a magnification and rotation of the image objects of the image grid.

The manufacture of the image-object grid occurs in the known moiré magnification arrangements with conventional printing technologies or also by means of embossing technologies with different steps in the further processing. However, both printing and suitable embossing technologies are now generally available on the market so that such moiré magnification arrangements can be reproduced relatively easily by counterfeiters.

Based on that, the object of the present invention is to avoid the disadvantages of the background art and especially to specify a security element having a micro-optical moiré magnification arrangement of high counterfeit security.

This object is solved by the security element having the features of the main claim. A method for manufacturing such a security element, a security paper and a data carrier having such a security element are specified in the coordinated claims. Developments of the present invention are the subject of the dependent claims.

According to the present invention, a generic security element includes a micro-optical moiré magnification arrangement having

- a motif image that consists of a planar periodic or at least locally periodic arrangement of a plurality of micromotif elements, and
- a planar periodic or at least locally periodic arrangement of a plurality of microfocusing elements for the moiré-magnified viewing of the micromotif elements of the motif image.

Here, the motif image includes two or more sub-regions having micromotif elements that differ from each other in their contrast, the shape of the sub-regions forming a macroscopic piece of image information, in the form of characters, patterns or codes, that is perceptible due to the contrast differences in the micromotif elements.

Here, the present invention is based on the idea of integrating into the security element, through a controlled individual variation of the contrast of the micromotif elements, an additional macroscopically perceptible piece of image information and thus a security feature of a higher level. As becomes clear from the following description, it is possible to produce this macroscopic piece of image information without additional work steps, such as the demetallization of metallic coating layers, and thus particularly economically.

Here, a macroscopically perceptible piece of image information is understood to be a piece of image information that is perceptible with the naked eye without optical aids. Preferably even the sub-regions themselves each have dimensions of 0.1 mm or more.

In a first advantageous variant of the present invention, the contours of the sub-regions form the macroscopic piece of image information, while in a second, likewise advantageous variant of the present invention, the sub-regions each depict regions of identical brightness level in a halftone image. In the latter case, not the sub-regions themselves, but rather merely the halftone image formed by them must be perceptible with the naked eye in order to form a macroscopic piece of image information.

The micromotif elements of the sub-regions can each exhibit the same shape or, at least in part, different shapes. Here, preferably only a few different shapes are used. The shape of the micromotif elements can also change slowly across the area of the security element and, for example, change continuously from a first form into a second form.

The contrast differences in the micromotif elements are advantageously produced through a variation of the line width and/or the line depth and/or the color of the micromotif elements.

The number of contrast gradations occurring in the micromotif elements is, in principle, arbitrary. In many cases, however, the macroscopic piece of image information is more easily perceptible with a lower number of contrast gradations. The micromotif elements in the sub-regions are thus preferably present in two, three, four or five contrast gradations.

The contrast transitions between adjacent sub-regions can be discontinuous such that the contrast changes discontinuously from one sub-region to the next. But the contrast transitions can also be continuous in order to produce, for example, a slowly changing contrast gradient. Here, continuous contrast transitions especially include quasi-continuous contrast transitions with small contrast differences that are barely or not perceptible for the eye between adjacent sub-regions.

In some embodiments, it is appropriate to keep the contrast of the micromotif elements very low in at least one sub-region. In the extreme case, the contrast of the micromotif elements can even disappear.

The lateral dimensions of the micromotif elements and of the microfocusing elements are preferably below about 100 μm, preferably between about 5 μm and about 50 μm, particularly preferably between about 10 μm and about 35 μm.

In a development of the present invention, the micromotif elements in the sub-regions are each arranged in the form of a grid, the grid arrangements in different sub-regions differing in at least one grid parameter, especially in the line screen, the grid orientation or the lattice symmetry of the grid.

In this case, the microfocusing element arrangement is preferably likewise subdivided into sub-regions in which the arrangement of the microfocusing elements is each coordinated with the grid arrangement of the associated sub-region of the micromotif elements.

In a preferred embodiment of the security element according to the present invention, the macroscopic piece of image information is perceptible in transmission.

The arrangement of micromotif elements and the arrangement of microfocusing elements advantageously form in each case, at least locally, a two-dimensional Bravais lattice, the arrangement of micromotif elements and/or the arrangement of microfocusing elements forming a Bravais lattice having the symmetry of a parallelogram lattice.

The motif image and the arrangement of microfocusing elements are expediently arranged at opposing surfaces of an optical spacing layer. The spacing layer can comprise, for example, a plastic foil and/or a lacquer layer.

The microfocusing elements of the moiré magnification arrangement can be present as transmissive, refractive or diffractive lenses or as a hybrid form of these lens types. Preferably, they are formed by non-cylindrical microlenses, especially by microlenses having a circular or polygonally delimited base area. Furthermore, the arrangement of microfocusing elements can be provided with a protective layer whose refractive index preferably differs from the refractive index of the microfocusing elements by at least 0.3. In addition to the protection against environmental effects, such a protective layer also prevents the microfocusing element arrangement from being easily molded. If the microfocusing elements are manufactured, for instance, from lacquer having a refractive index of 1.2 to 1.5, then, for example, as protective layers, lacquer filled with nanoparticles composed of titanium oxide are appropriate, which are commercially available having refractive indices between 1.7 and 2.

The micromotif elements are preferably present in the form of microcharacters or micropatterns. In particular, the micromotif elements can be present in a printing layer. It is understood that, to produce the moiré magnification effect, the micromotif elements must be largely identical. However, a slow, especially periodically modulated change in the appearance of the micromotif elements and thus also in the magnified images is likewise also within the scope of the present invention. Also, individual micromotif elements or a portion thereof can be furnished with additional pieces of information that do not appear in the magnified moiré image, but that can be used as additional authenticating marks.

The total thickness of the security element is advantageously below 50 μm, which ensures that it is well suited for use in security paper, value documents and the like.

The security element itself preferably constitutes a security thread, a tear strip, a security band, a security strip, a patch or a label for application to a security paper, value document or the like. In an advantageous embodiment, the security element can span a transparent or uncovered region of a data carrier, for example a window region of a banknote. Here, different appearances can be realized on different sides of the data carrier.

The present invention includes also a method for manufacturing a security element having a micro-optical moiré magnification arrangement, in which a motif image that consists of a planar periodic or at least locally periodic arrangement of a plurality of micromotif elements, and a planar periodic or at least locally periodic arrangement of a plurality of microfocusing elements are arranged such that the micromotif elements are perceptible in magnification when viewed through the microfocusing elements, wherein the motif image having two or more sub-regions having micromotif elements that differ from each other in their contrast are developed in such a way that, due to the contrast differences in the micromotif elements, the shape of the sub-regions forms a perceptible macroscopic piece of image information in the form of characters, patterns or codes.

An inventive security paper for manufacturing security or value documents, such as banknotes, checks, identification cards, certificates or the like, is furnished with a security element of the kind described above. The security paper can especially comprise a carrier substrate composed of paper or plastic.

The present invention also includes a data carrier, especially a branded article, a value document or the like, having a security element of the kind described above. Here, the security element can especially be arranged in a window region, that is, a transparent or uncovered region of the data carrier.

Further exemplary embodiments and advantages of the present invention are described below with reference to the drawings. To improve clarity, a depiction to scale and proportion was dispensed with in the drawings.

Figure 2:
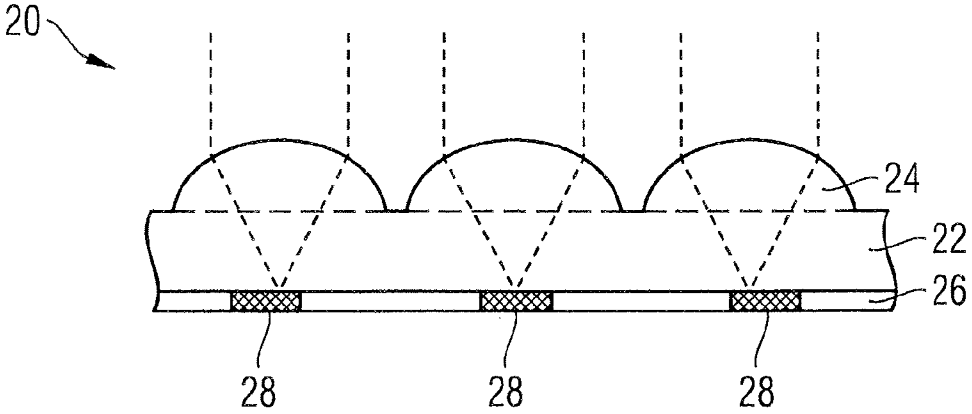
Figure 3A:
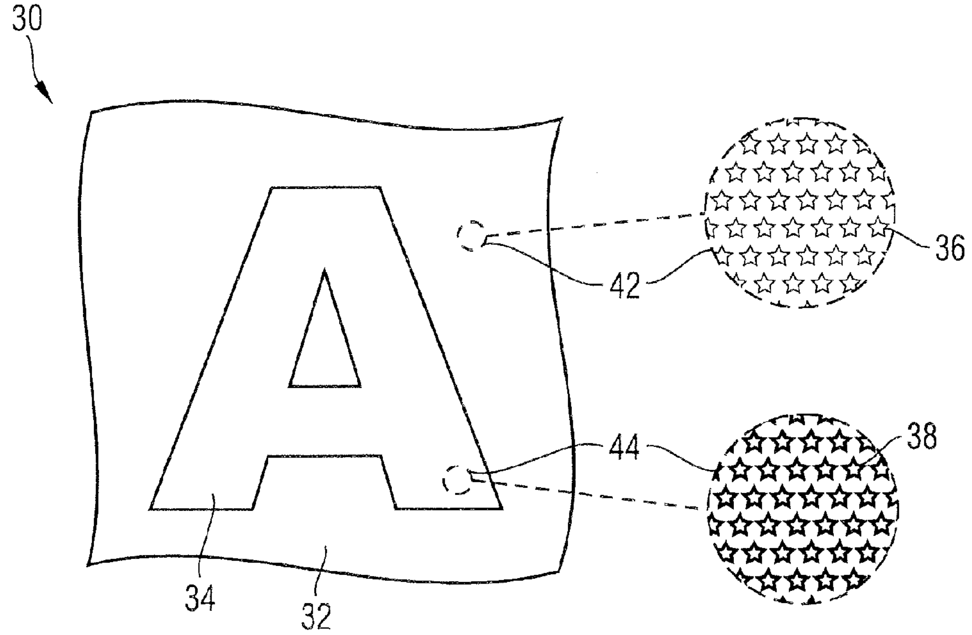
Figure 3B:
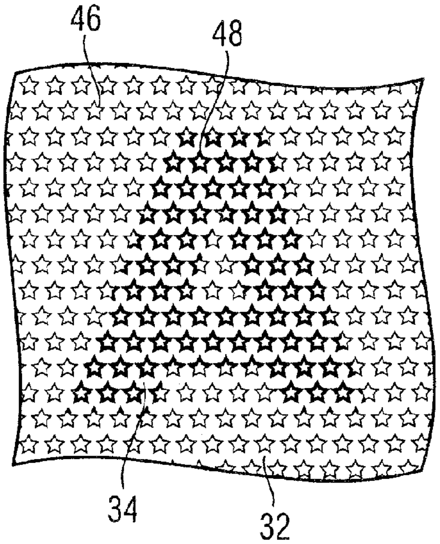
Figure 3C:
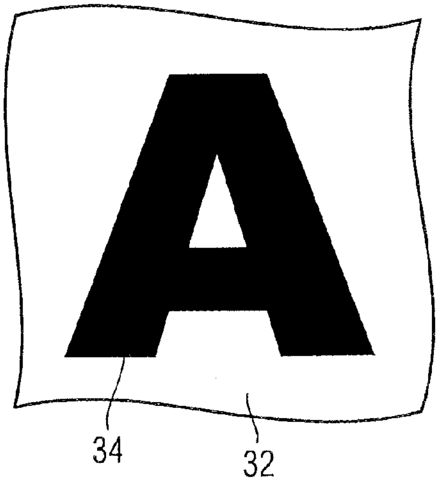
Figure 4A:
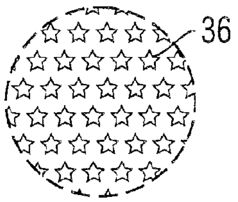
Figure 4B:
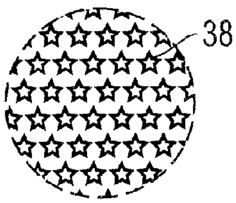
Figure 4C:
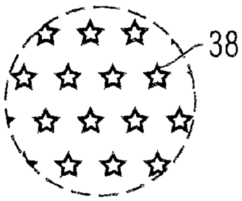
Figure 4D:
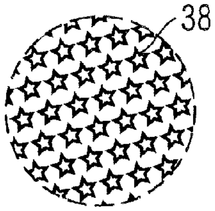
Figure 4E:
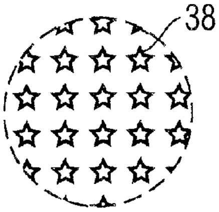
Figure 6:
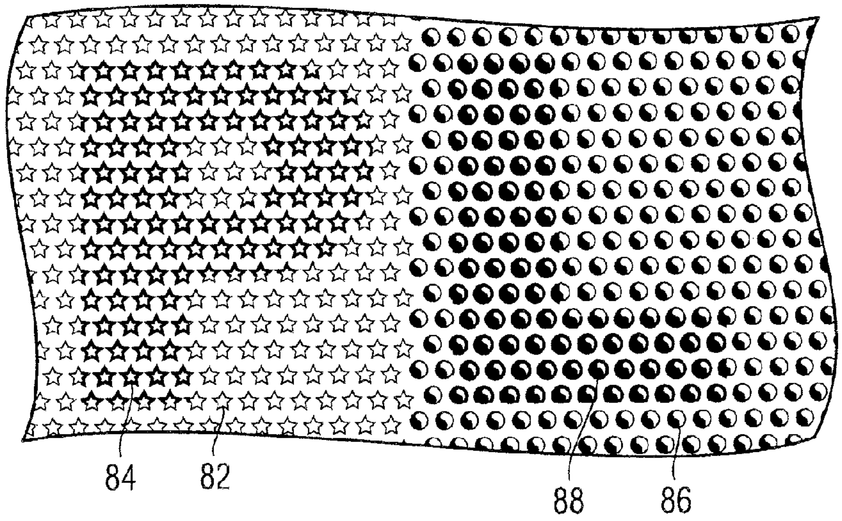
Figure 5A:
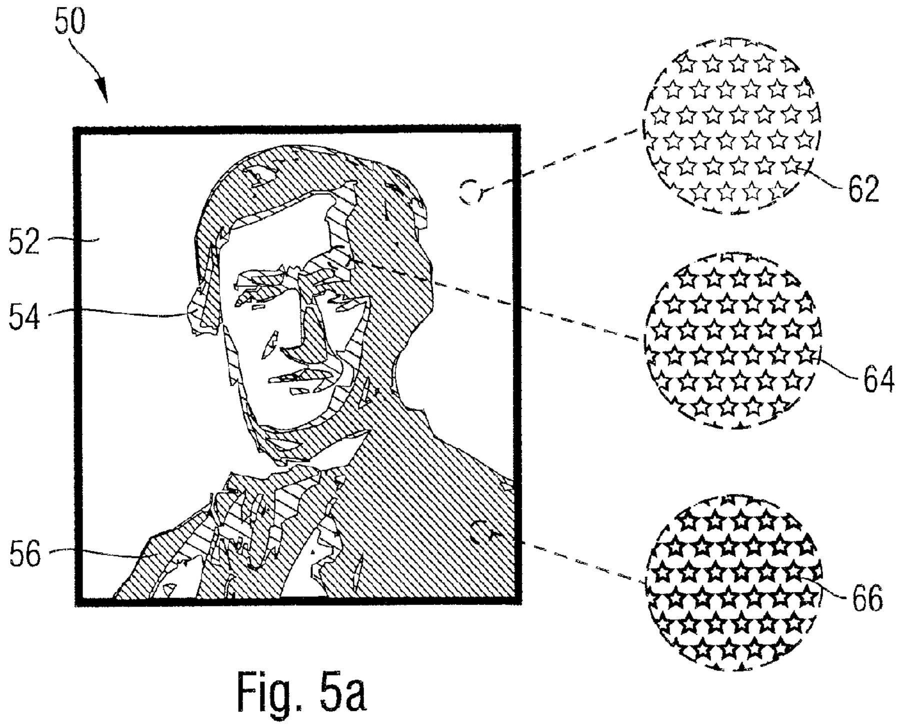
Figure 5B:
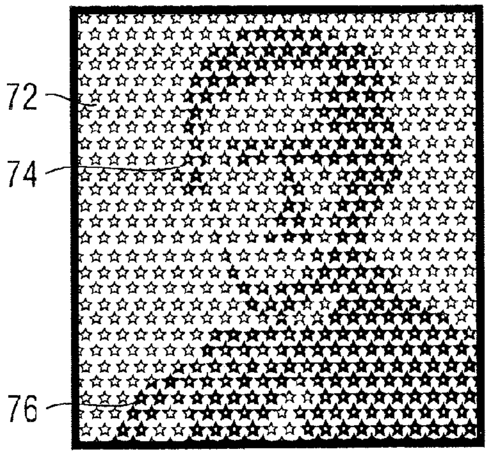
Figure 5C:
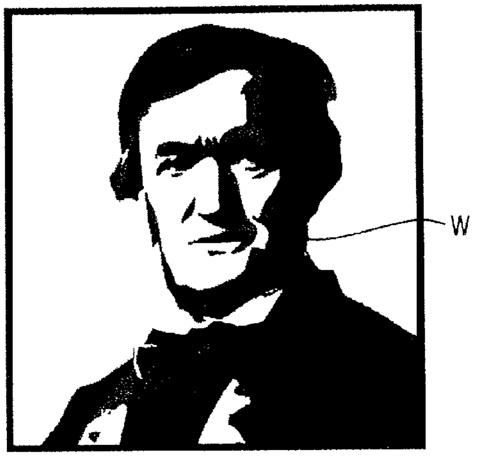

Shown are:

FIG. 1 a schematic diagram of a banknote having an embedded security thread and a see-through security element arranged over a see-through region, FIG. 2 schematically, the layer structure of a security element according to the present invention, in cross section, FIG. 3 in (a), the motif image of a security element according to the present invention, in top view, in (b), the appearance of the security element when viewed in top view, and in (c), the appearance of the security element when viewed in transmission, FIG. 4 micromotif elements in sections of sub-regions of motif images, wherein (a) and (b) correspond to the sections shown in FIG. 3(*a*), and (c) to (e) show modifications of the grid depicted in (b), FIG. 5 an inventive see-through security element according to a further exemplary embodiment of the present invention, wherein (a) shows a schematic top view of the motif image of the see-through security element, (b) the visual impression of the motif image when viewed in top view and (c) the visual impression when viewed in transmission, and FIG. 6 the visual impression of a security element according to a further exemplary embodiment of the present invention when viewed in top view.

The invention will now be explained using a security element for a banknote as an example. For this, FIG. 1 shows a schematic diagram of a banknote 10 that is provided with two security elements 12 and 16 according to exemplary embodiments of the present invention. Here, the first security element constitutes a security thread 12 that emerges at certain window regions 14 on the surface of the banknote 10, while it is embedded in the interior of the banknote 10 in the regions lying therebetween. The second security element is developed in the form of a see-through security element 16 that is arranged over a see-through region 18, such as a window region or a through opening in the banknote 10.

Both the security thread 12 and the see-through security element 16 can include a moiré magnification arrangement having an additional macroscopic piece of image information according to an exemplary embodiment of the present invention. First, the fundamental operating principle of micro-optical moiré magnification arrangements according to the present invention is explained briefly with reference to FIG. 2.

FIG. 2 shows schematically the layer structure of a security element 20 according to the present invention, in cross section, only the portions of the layer structure that are required to explain the functional principle being depicted.

The security element 20 includes an optical spacing layer 22 whose top is provided with a regular arrangement of microlenses 24. Here, in some regions, the arrangement of the microlenses 24 forms in each case a grid having prechosen grid parameters, such as line screen, grid orientation and lattice symmetry. The lattice symmetry can be described by a two-dimensional Bravais lattice, a hexagonal symmetry being assumed for the following explanation for the sake of simplicity, even if the Bravais lattice according to the present invention can exhibit a lower symmetry and thus a more general shape.

On the bottom of the spacing layer 22, a motif layer 26 is arranged that includes a likewise grid-shaped arrangement of homogeneous micromotif elements 28. Also the arrangement of the micromotif elements 28 can be described by a two-dimensional Bravais lattice having a prechosen symmetry, a hexagonal lattice symmetry again being assumed for illustration. As indicated in FIG. 2 by the offset of the micromotif elements 28 with respect to the microlenses 24, the Bravais lattice of the micromotif elements 28 differs slightly in its symmetry and/or in the size of the lattice parameters from the Bravais lattice of the microlenses 24 to produce the desired moiré magnification effect.

The spacing of adjacent microlenses 24 is preferably chosen to be as small as possible in order to ensure as high an areal coverage as possible and thus a high-contrast depiction. The spherically or aspherically designed microlenses 24 exhibit a diameter between 5 μm and 50 μm, preferably merely between 10 μm and 35 μm, and are thus not perceptible with the naked eye. Here, the lattice period and the diameter of the micromotif elements 28 are on the same order of magnitude as those of the microlenses 24, so in the range from 5 μm to 50 μm, preferably from 10 μm to 35 μm, such that also the micromotif elements 28 are not perceptible even with the naked eye.

The optical thickness of the spacing layer 22 and the focal length of the microlenses 24 are so coordinated with each other that the micromotif elements 28 are spaced approximately the lens focal length apart. Due to the slightly differing lattice parameters, the viewer sees, when viewing the security element 20 from above through the microlenses 24, a somewhat different sub-region of the micromotif elements 28 each time such that the plurality of microlenses produces, overall, a magnified image of the micromotif elements 28.

Here, the resulting moiré magnification depends on the relative difference between the lattice parameters of the Bravais lattice used. If, for example, the grating periods of two hexagonal lattices differ by 1%, then a 100× moiré magnification results. For a more detailed description of the operating principle and advantageous arrangements of the micromotif elements and the microlenses, reference is made to the likewise pending German patent application 10 2005 062 132.5, whose disclosure in this regard is incorporated in the present application.

In such moiré magnification arrangements, the motif image is now, according to the present invention, developed having two or more sub-regions that include micromotif elements that differ from each other in their contrast and whose shape, due to the contrast differences in the micromotif elements, forms a perceptible macroscopic piece of image information in the form of characters, patterns or codes.

For this, FIG. 3(*a*) shows a schematic top view of the motif image 30 of a see-through security element, according to an exemplary embodiment of the present invention, that is joined with a microlens array 24 via an optical spacing layer 22 in the manner explained above. The motif image 30 includes a plurality of micromotif elements 36, 38 having an identical shape, but locally a different contrast. The different contrast is created in the exemplary embodiment in that the micromotif elements 36 are developed in a first sub-region 32 of the motif image 30 having a small line width, while the micromotif elements 38 of a second sub-region 34 are developed having a large line width.

The contour of the sub-regions 32, 34 forms a macroscopic piece of image information, in the exemplary embodiment the letter "A". The dimensions of the macroscopic piece of image information "A" are typically in the range of a few millimeters or centimeters and are thus considerably larger than the micromotif elements 36, 38, whose dimensions are merely in the range of a few tens of micrometers. Accordingly, the micromotif elements 36, 38 in FIG. 3(*a*) are depicted individually only in magnified detailed cutaways 42, 44 of the sub-regions 32, 34.

The micromotif elements 36, 38 of the two sub-regions are developed having an identical shape, in the exemplary embodiment in the form of a 5-pointed star, but a different line thickness. Accordingly, when the motif image 30 is viewed through the microlens array 24, as depicted in the reflected light situation in FIG. 3(*b*), locally differently contrasting magnified images 46 or 48 result. In an assumed 100× moiré magnification of the see-through security element, the dimensions of the images 46, 48 are then 100 times larger than the dimensions of the micromotif elements 36, 38.

For the viewer, in the reflected-light viewing situation in FIG. 3(*b*), two overlapping optical effects are perceptible:

For one, the viewer perceives the moiré magnification effect with magnified images 46, 48 of the micromotif elements 36, 38, which is associated with the movement effects known from moiré magnification arrangements upon tilting the security element. For example, the motif image 30 and the microlens array 24 can be designed for the appearance of an ortho-parallactic movement effect in which the magnified images 46, 48 move vertically to the tilt direction and not parallel to the tilt direction, as one would intuitively expect. Depending on the choice of the focal lengths of the microlenses 24 and the difference of the lattice parameters, the images 46, 48 can also appear to float in front of or behind the image plane of the security element.

The second optical effect is formed by the macroscopic variation of the contrast of the moiré-magnified images 46, 48 in the sub-regions 32 and 34. This optical effect leads to the depiction of a fixed, with respect to the plane of the security element, macroscopic piece of image information that is formed in the exemplary embodiment by the contour of the letter "A" that is clearly perceptible in FIG. 3(*b*).

If, on the other hand, the motif image 30 of the see-through security element is viewed through the micromotif element arrangement, as depicted in FIG. 3(*c*) as a transmitted light situation, then only the fixed contrast difference of the sub-regions 32 and 34 is perceptible. A moiré magnification effect does not occur in this viewing situation, so the image impression of a dark letter "A" against a light background results for the viewer, as shown in FIG. 3(*c*).

Instead of or in addition to the line width, also the line depth and/or the color of the micromotif elements in the sub-regions can be varied to obtain a different contrast effect. In addition to discontinuous contrast transitions with a discontinuous change in the contrast, also continuous contrast transitions can be realized, for example through a continuous increase or decrease in the line width of the micromotif elements.

The number of different contrast gradations in one motif image is, in principle, arbitrary. However, in many application cases, a limited number of contrast gradations leads to easier perceptibility of the macroscopic information such that, presently, embodiments having two to five contrast gradations are preferred.

In the sub-regions 32, 34 in which the micromotif elements differ from each other in the contrast, additionally also the grids in which the respective micromotif elements are arranged can be developed differently, as illustrated with reference to FIG. 4.

Here, FIGS. 4(*a*) and 4(*b*) first show, again, the micromotif elements 36 and 38 in the sections 42 and 44 in FIG. 3(*a*), which are both arranged in a grid having a hexagonal lattice symmetry. In a constant design of the grid arrangement in the sub-region 32 (FIG. 4(*a*)), the micromotif elements 38 of the sub-region 34 can then be arranged, for example, in a hexagonal grid of a larger line screen, as depicted in FIG. 4(*c*), in a hexagonal grid of the same line screen but different orientation, as shown in FIG. 4(*d*), or in a grid having another, for example quadratic, lattice symmetry, as shown in FIG. 4(*e*). Of course also more than one grid parameter can be varied simultaneously.

The grid arrangement of the associated microlenses 24 is expediently coordinated with the grid arrangement of the micromotif elements 36, 38 in the respective sub-regions. In this way, through the variation of the grid parameters, the above-described fixed contrast variation can be expanded by a further optical effect, namely by a variation of the primary moiré magnification effect in the different sub-regions 32, 34.

For example, the sub-region 34 that depicts the interior of the letter "A" in FIG. 3 can exhibit another moiré magnification than the sub-region 32 such that the motif elements there appear not only having another contrast, but also in another magnification. In another variant, the movement effects in the sub-regions 32, 34 can differ from each other such that the magnified images 46, 48 move upon tilting the security element in the sub-regions 32, 34 in different directions.

A further exemplary embodiment of a see-through security element according to the present invention is depicted in FIG. 5, with FIG. 5(*a*) showing a schematic top view of the motif image 50 of the see-through security element, FIG. 5(*b*) the visual impression when the motif image 50 is viewed in top view, and FIG. 5(*c*) the visual impression when viewed in transmission.

The motif image 50 includes a plurality of micromotif elements 62, 64, 66 having an identical shape, in the exemplary embodiment in the form of a 5-pointed star, but locally a different line thickness and thus locally a different contrast. In a first sub-region 52, the micromotif elements 62 are developed having a very small line width, while the micromotif elements 64 and 66 in the sub-region 54 or 56 are developed having a medium or large line width. In the exemplary embodiment in FIG. 5, the sub-regions that include in each case micromotif elements of the same line width are not connected and, for clear illustration, are thus filled with a narrow hatching (sub-region 56), filled with a wide hatching (sub-region 54) or not hatched (sub-region 52).

The sub-regions 52, 54, 56 each depict regions of the same brightness level in a halftone image, such as a portrait. Here, three brightness levels, corresponding to the tonal values white, gray and black, are often already sufficient to produce a halftone image that is easily perceptible for the human eye. The dimensions of the halftone image are in the macroscopic range, so the motif image 50 depicts a piece of image information that is perceptible with the naked eye. Accordingly, the considerably smaller micromotif elements 62, 64, 66, at, for example, about 30 μm, are depicted, as in FIG. 3(*a*), only in magnified sections of the sub-regions 52, 54, 56.

When the security element is viewed in top view, two optical effects appear simultaneously, as illustrated in FIG. 5(*b*). On the one hand, a moiré magnification effect with magnified images 72, 74, 76 of the micromotif elements and the already mentioned movement effects is perceptible for the viewer. Furthermore, due to the macroscopic variation of the contrast of the moiré-magnified images 72, 74, 76 in the sub-regions 52, 54, 56, a halftone image is also perceptible. This halftone image forms a fixed macroscopic piece of image information that, unlike the individual magnified images 72, 74, 76, executes no relative movement when the security element is tilted.

When the security element is viewed in transmission, no moiré magnification effect appears but rather, here, exclusively the fixed contrast difference in the sub-regions 52, 54, 56 and thus the halftone image W is perceptible. For the viewer, an image impression results, as depicted in FIG. 5(*c*).

In the further exemplary embodiment in FIG. 6, a security element 80 includes a motif image having micromotif elements that exhibit, in addition to different contrasts, also different shapes. With reference to the image impression shown in FIG. 6, when the security element is viewed in top view, a first sub-region 82 includes micromotif elements of a first shape (star) and having a small line width. A second sub-region 84 includes micromotif elements of the same shape (star) having a large line width. A third sub-region 86 includes micromotif elements of a second shape (symbol) having a small line width, while a fourth sub-region 88 includes micromotif elements of the second shape (symbol) having a large line width.

With their contours, the first and second sub-region 82, 84 and the third and fourth sub-region 86, 88 form a macroscopic piece of image information, in the exemplary embodiment the letter sequence "PL".

When the security element 80 is viewed in top view, the two effects already described in connection with FIG. 3 result, the magnified images of the micromotif elements additionally differing in the sub-regions of the letters "P" (sub-regions 82, 84) and "L" (sub-regions 86, 88). In transmitted light, in contrast, due to the lack of the moiré magnification effect, none of the micromotif elements is perceptible and, at the same contrast difference of the micromotif elements involved, the letter sequence "PL" appears uniformly dark against a light background.

The invention claimed is:

1. A security element for security papers, value documents and the like, comprising a micro-optical moiré magnification arrangement comprising a motif image that consists of a planar periodic or at least locally periodic arrangement of a plurality of micromotif elements, a planar periodic or at least locally periodic arrangement of a plurality of microfocusing elements for the moiré-magnified viewing of the micromotif elements of the motif image, and an optical spacing layer joined to the motif image and the arrangement of microfocusing elements, the motif image including two or more sub-regions comprising micromotif elements that differ from each other in their contrast, and the shape of the sub-regions forming a macroscopic piece of image information, in the form of characters, patterns or codes, that is perceptible due to the contrast differences in the micromotif elements;

wherein the contrast differences are produced by a variation in the line width and/or the line depth and/or the color of the micromotif elements;

wherein the motif image and the arrangement of microfocusing elements are joinedly arranged at opposing surfaces of the optical spacing layer.

2. The security element according to claim 1, characterized in that the sub-regions each have dimensions of 0.1 mm or more.

3. The security element according to claim 1, characterized in that the contours of the sub-regions form the macroscopic piece of image information.

4. The security element according to claim 1, characterized in that the sub-regions each depict regions of identical brightness level in a halftone image.

5. The security element according to claim 1, characterized in that the micromotif elements of the sub-regions each exhibit the same shape.

6. The security element according to claim 1, characterized in that the micromotif elements of the sub-regions exhibit different shapes, at least in part.

7. The security element according to claim 1, characterized in that the micromotif elements are present in the sub-regions in two, three, four or five contrast gradations.

8. The security element according to claim 1, characterized in that the contrast transitions between adjacent sub-regions are discontinuous.

9. The security element according to claim 1, characterized in that the contrast transitions between adjacent sub-regions are continuous.

10. The security element according to claim 1, characterized in that the contrast of the micromotif elements is very low in at least one sub-region.

11. The security element according to claim 1, characterized in that the lateral dimensions of the micromotif elements and the microfocusing elements are below about 100 μm.

12. The security element according to claim 1, characterized in that the micromotif elements in the sub-regions are each arranged in the form of a grid and the grid arrangements in different sub-regions differ in at least one grid parameter, especially in the line screen, the grid orientation or the lattice symmetry of the grid.

13. The security element according to claim 12, characterized in that the microfocusing element arrangement is subdivided into sub-regions in which the arrangement of the microfocusing elements is coordinated in each case with the grid arrangement of the associated sub-region of the micromotif elements.

14. The security element according to claim 1, characterized in that the macroscopic piece of image information is perceptible in transmission.

15. The security element according to claim 1, characterized in that the arrangement of micromotif elements and the arrangement of microfocusing elements each forms, at least locally, a two-dimensional Bravais lattice, the arrangement of micromotif elements and/or the arrangement of microfocusing elements forming a Bravais lattice having the symmetry of a parallelogram lattice.

16. The security element according to claim 1, characterized in that the microfocusing elements are formed by noncylindrical microlenses, especially by microlenses having a circular or polygonally delimited base area.

17. The security element according to claim 1, characterized in that the micromotif elements are present in the form of microcharacters or micropatterns.

18. The security element according to claim 1, characterized in that the total thickness of the security element is below 50 μm.

19. The security element according to claim 1, characterized in that the security element is a security thread, a tear strip, a security band, a security strip, a patch or a label for application to a security paper, value document or the like.

20. A security paper for manufacturing security or value documents, such as banknotes, checks, identification cards, certificates or the like, that is furnished with the security element according to claim 1.

21. The security paper according to claim 20, characterized in that the security paper comprises a carrier substrate composed of paper or plastic.

22. A data carrier, especially a branded article, value document or the like, comprising the security element according to claim 1.

23. The data carrier according to claim 22, characterized in that the security element is arranged in a window region of the data carrier.

24. A use of the security element according to claim 1, of a security paper for manufacturing security or value documents, such as banknotes, checks, identification cards, certificates or the like, that is furnished with the security element, or of a data carrier, especially a branded article, value document or the like, comprising the security element for securing goods of any kind against counterfeiting.

25. The security element of claim 1, wherein the lateral dimensions of the micromotif elements and the microfocusing elements are between about 5 μm and about 50 μm.

26. A method for manufacturing a security element comprising a micro-optical moiré magnification arrangement, in which a motif image that consists of a planar periodic or at least locally periodic arrangement of a plurality of micromotif elements, and a planar periodic or at least locally periodic arrangement of a plurality of microfocusing elements are arranged such that the micromotif elements are perceptible in magnification when viewed through the microfocusing elements, wherein the micro-optical moiré magnification arrangement further comprises an optical spacing layer joined to the motif image and the arrangement of microfocusing elements, wherein the motif image comprising two or more sub-regions comprising micromotif elements that differ from each other in their contrast are developed in such a way that, due to the contrast differences in the micromotif elements, the shape of the sub-regions forms a perceptible macroscopic piece of image information in the form of characters, patterns or codes;

wherein the micromotif elements in different sub-regions are developed having a different line width and/or different line depth and/or different color in order to produce the contrast differences in the micromotif elements; and wherein the motif image and the arrangement of microfocusing elements are joinedly arranged at opposing surfaces of the optical spacing layer.

27. The method according to claim 26, characterized in that the micromotif elements are printed on a substrate, preferably in the form of microcharacters or micropatterns.

28. The method according to claim 26, characterized in that the sub-regions are each developed having dimensions of 0.1 mm or more.

29. The method according to claim 26, characterized in that the sub-regions are designed such that their contours form the macroscopic piece of image information.

30. The method according to claim 26, characterized in that the sub-regions are designed such that they each depict regions of identical brightness level in a halftone image.

* * * * *